United States Patent
Hadlo et al.

(10) Patent No.: US 11,927,223 B2
(45) Date of Patent: Mar. 12, 2024

(54) KEYED COUPLING SYSTEM FOR TORQUE TRANSMISSION

(71) Applicant: PRATT & WHITNEY CANADA CORP., Longueuil (CA)

(72) Inventors: Marta Hadlo, Rzeszów (PL); Mateusz Kesek, Dębica (PL); Maciej Piotrowski, Rzeszów (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 374 days.

(21) Appl. No.: 17/186,210

(22) Filed: Feb. 26, 2021

(65) Prior Publication Data

US 2022/0275837 A1    Sep. 1, 2022

(51) Int. Cl.
*F16D 1/08*    (2006.01)
*F16C 3/02*    (2006.01)

(52) U.S. Cl.
CPC .............. *F16D 1/0876* (2013.01); *F16C 3/02* (2013.01); *F16D 2250/00* (2013.01)

(58) Field of Classification Search
CPC .... F16B 3/00; F16D 1/0876; Y10T 403/7018; Y10T 403/7021; Y10T 403/7022; Y10T 403/7024
USPC ................................ 403/355, 356, 357, 358
See application file for complete search history.

(56) References Cited

U.S. PATENT DOCUMENTS

| | | | |
|---|---|---|---|
| 368,744 A | 8/1887 | Woodruff | |
| 921,401 A * | 5/1909 | Hjorth | F16D 1/0876 403/358 |
| 1,221,709 A * | 4/1917 | Dyett | F16D 1/0876 403/358 |
| 2,563,166 A | 8/1951 | Gardner | |
| 2,973,979 A * | 3/1961 | Walton | F16D 1/0876 403/358 |
| 2016/0061249 A1 | 3/2016 | Powell | |

FOREIGN PATENT DOCUMENTS

| | | | | |
|---|---|---|---|---|
| DE | 19649034 C1 * | 2/1998 | ........... | F16D 1/0876 |
| FR | 1025383 A * | 4/1953 | ........... | F16D 1/0876 |
| GB | 393473 A | 6/1933 | | |
| GB | 1429423 A * | 3/1976 | ........... | F16D 1/0876 |

OTHER PUBLICATIONS

European Patent Office, Communication re. extended European search report for European patent application No. 22158627.4, dated Jun. 14, 2022.
Wikipedia, Key (engineering), https://en.wikipedia.org/wiki/Key_(engineering)#Woodruff keys, accessed on Feb. 17, 2021.

* cited by examiner

*Primary Examiner* — Josh Skroupa
(74) *Attorney, Agent, or Firm* — Norton Rose Fulbright Canada LLP

(57) ABSTRACT

A Woodruff key system includes a rotatable shaft having a keyseat defined therein. The keyseat includes a pocket engaged with the Woodruff key, a first keyseat extension extending in a first axial direction from the Woodruff key relative to the shaft, and a second keyseat extension extending in a second axial direction opposite the first axial direction from the Woodruff key relative to the shaft. Respective depths of the first and second keyseat extensions are less than a depth of the pocket of the keyseat.

16 Claims, 9 Drawing Sheets

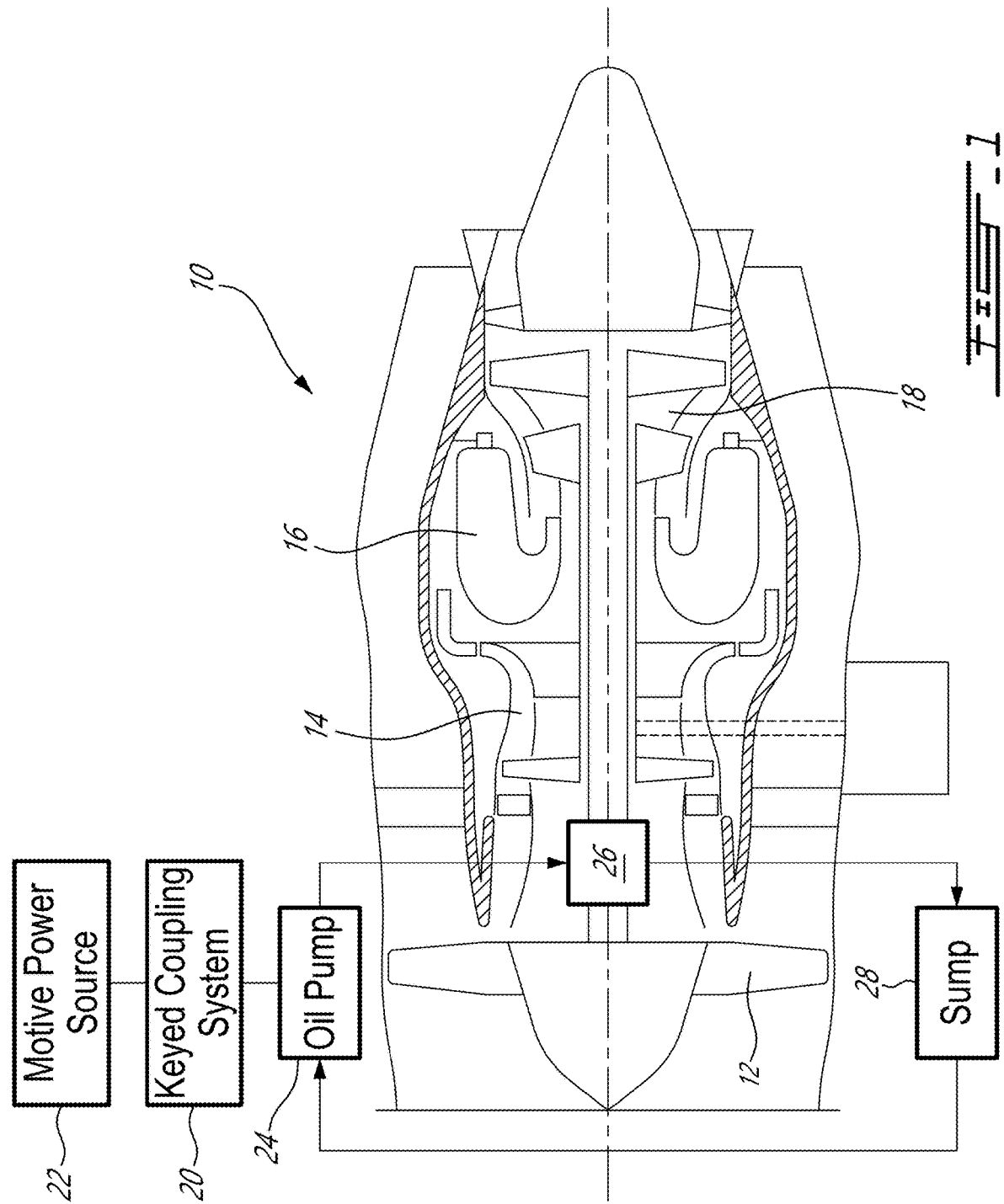

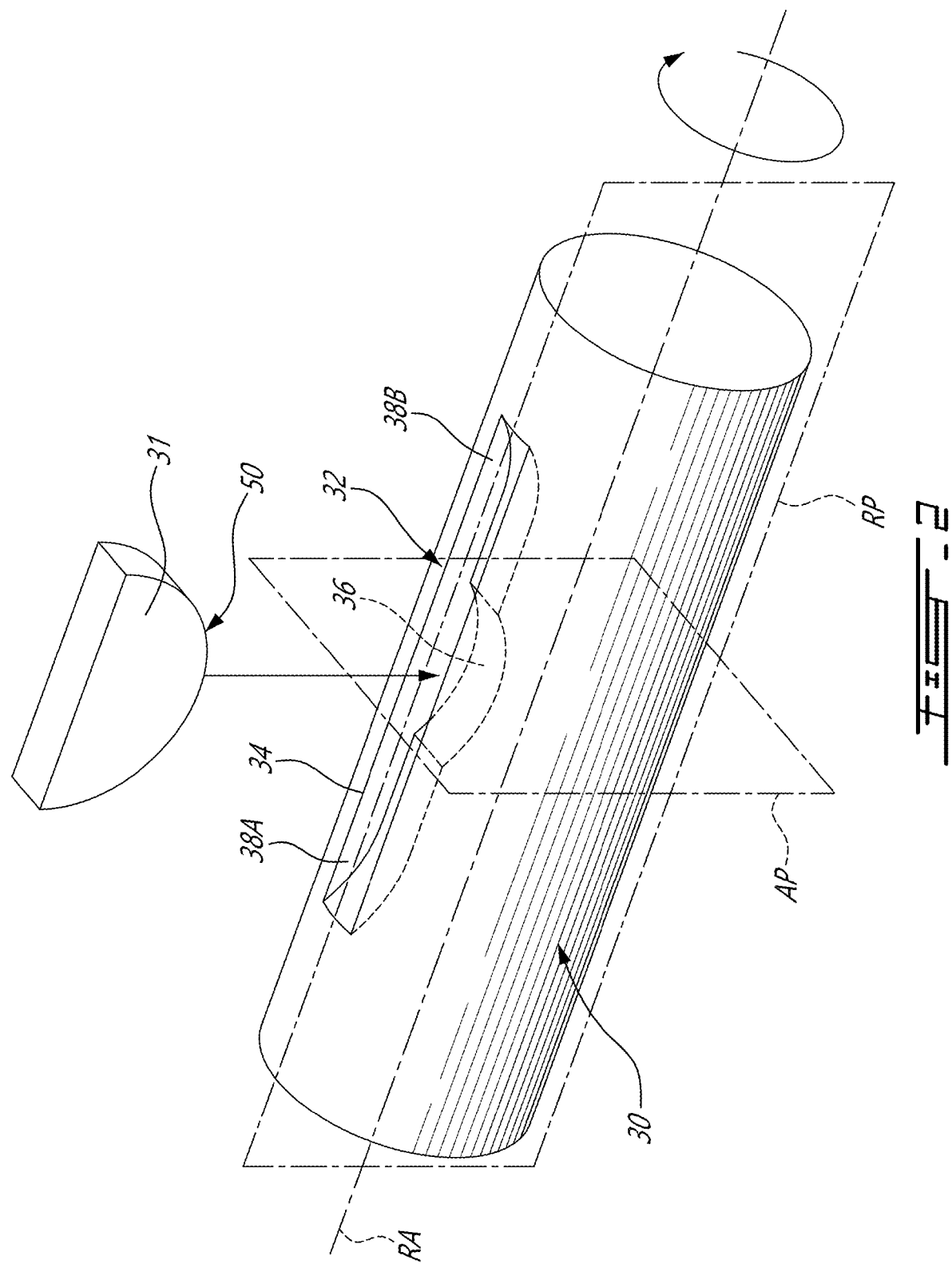

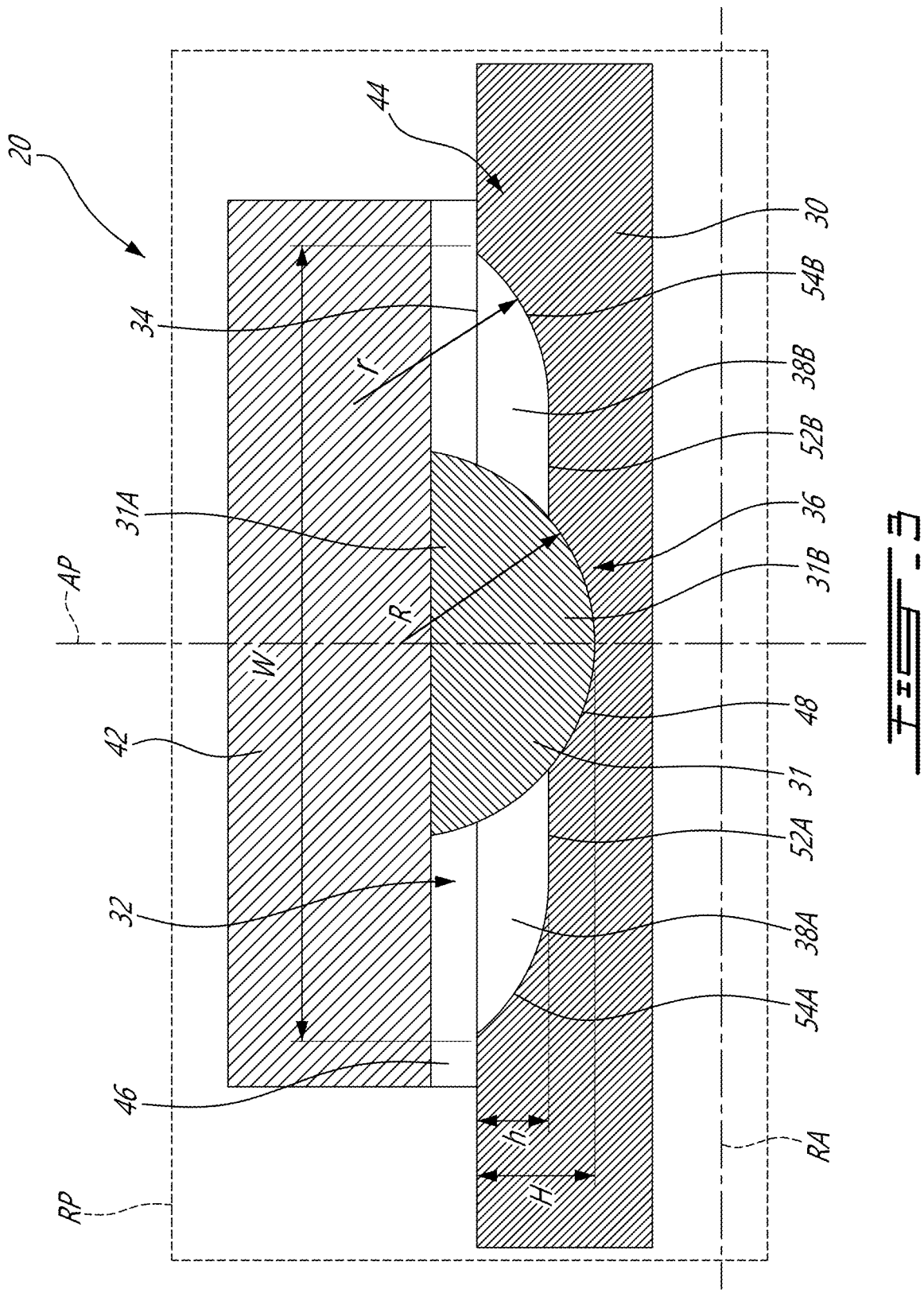

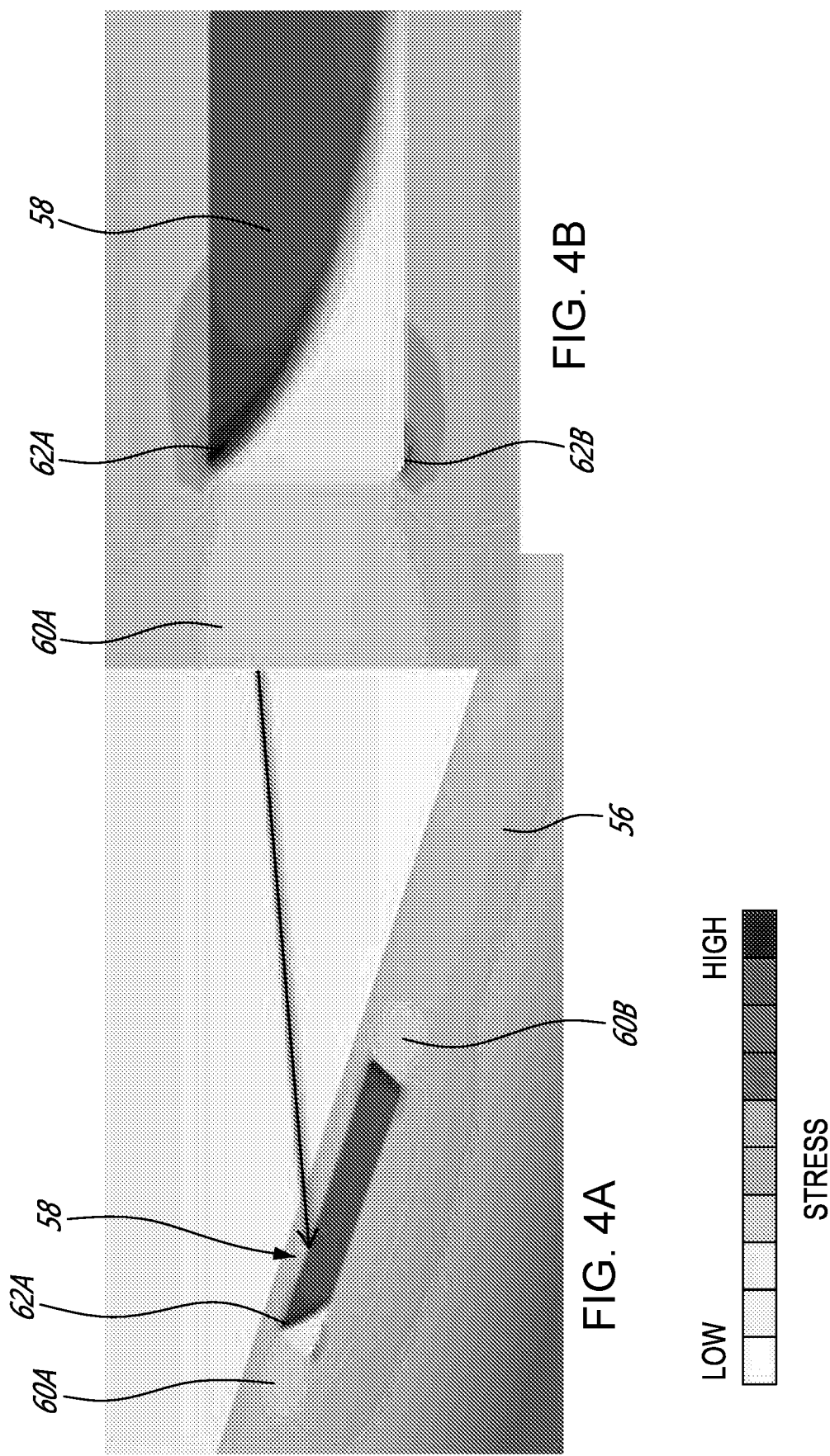

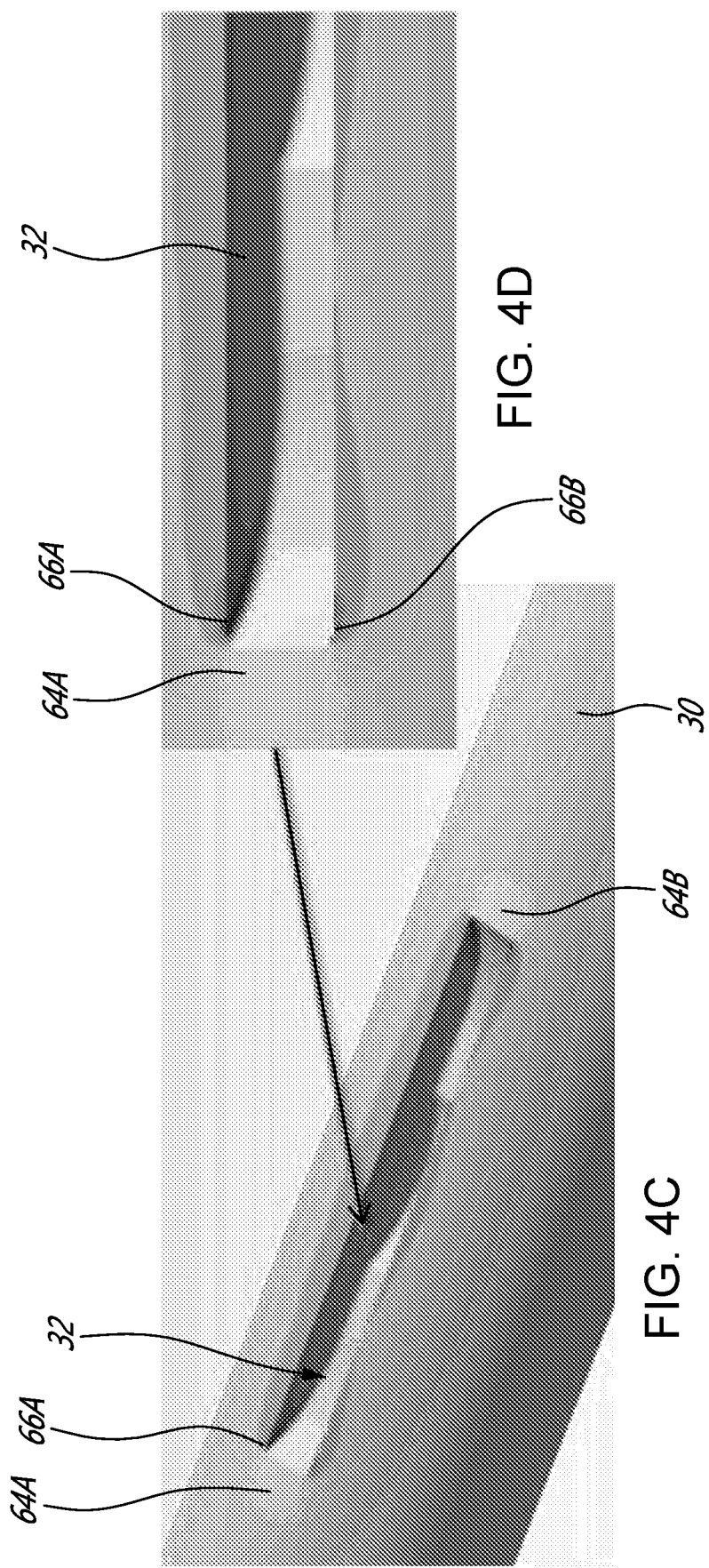

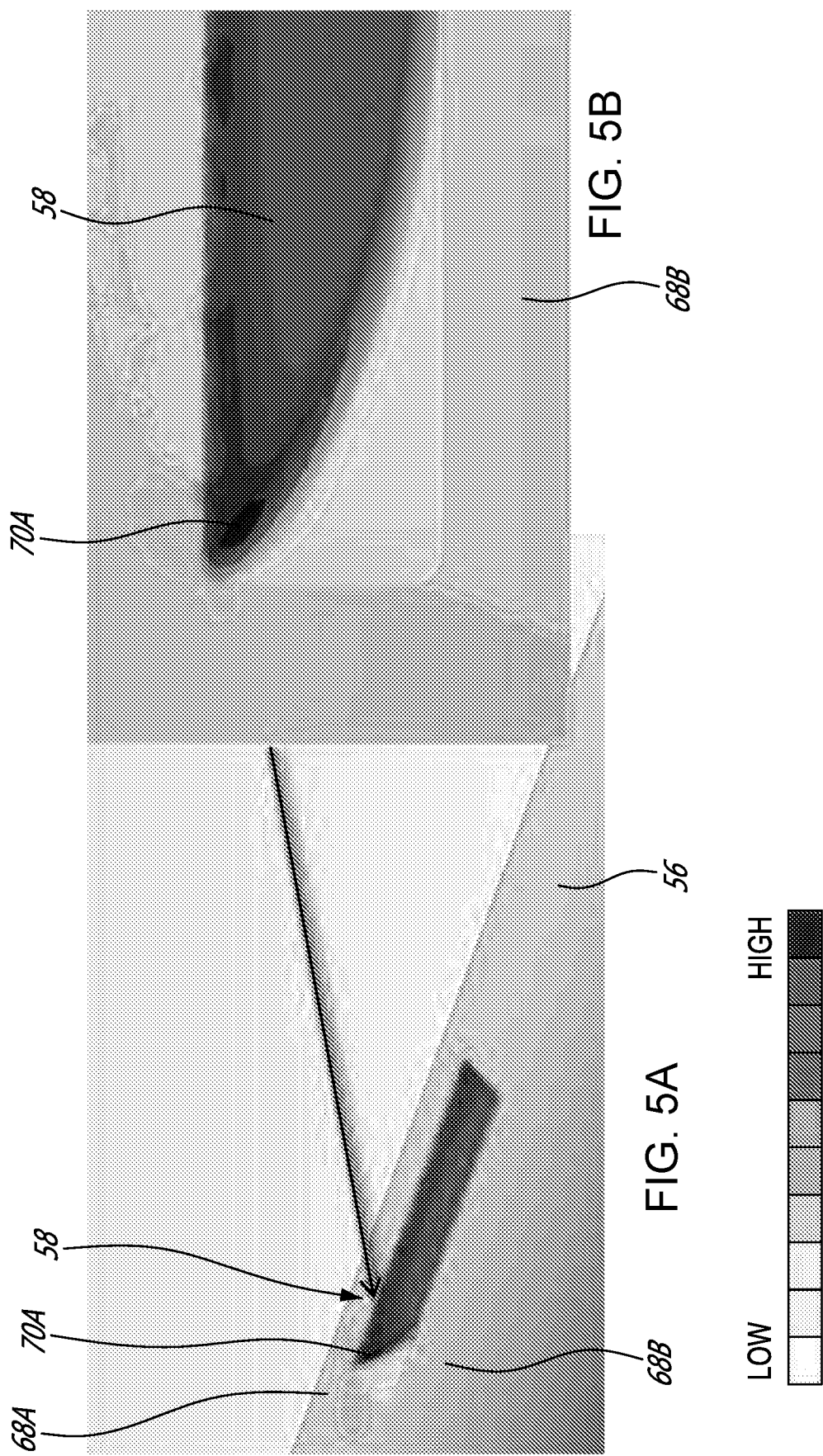

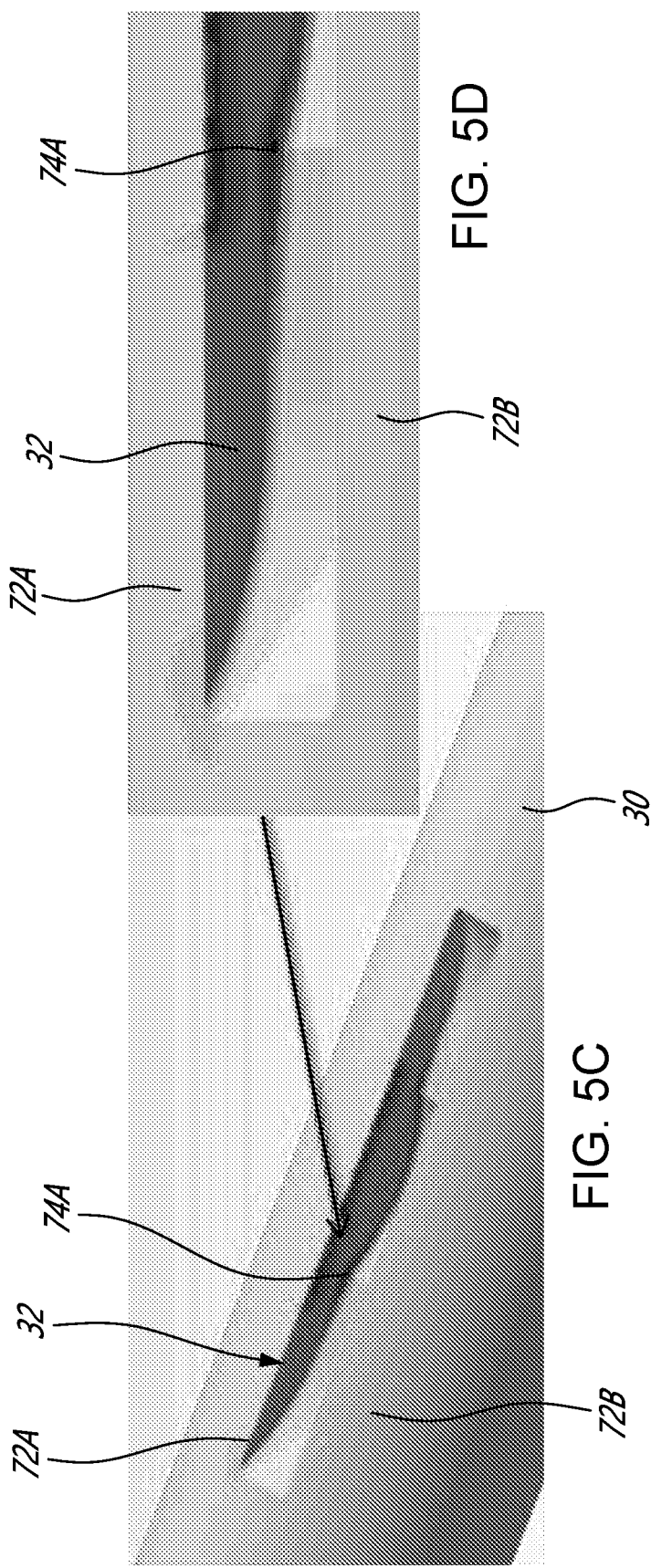

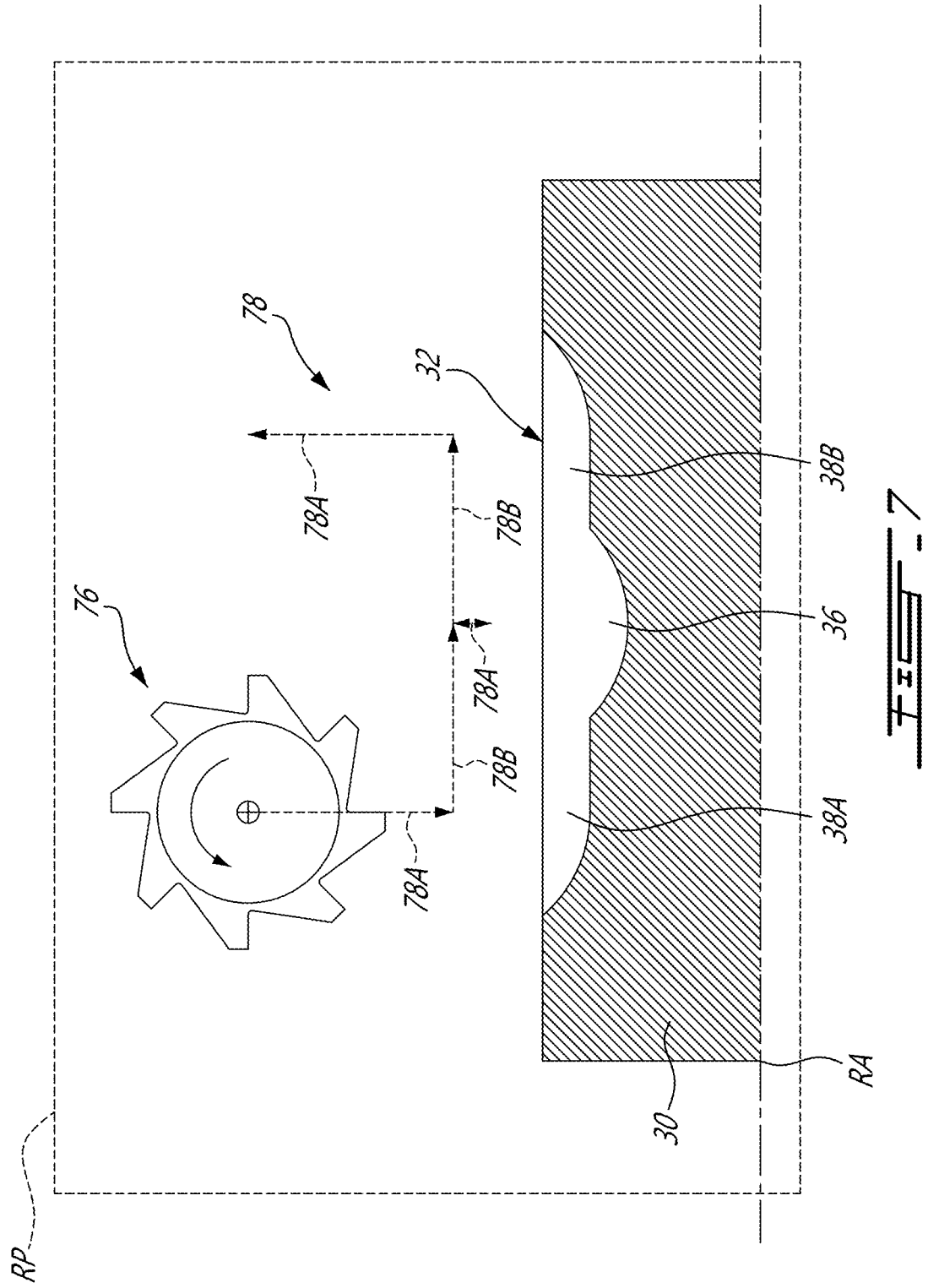

US 11,927,223 B2

KEYED COUPLING SYSTEM FOR TORQUE TRANSMISSION

TECHNICAL FIELD

The disclosure relates generally to keyed coupling systems for torque transmission, and more particularly to configurations of keyseats of keyed coupling systems.

BACKGROUND

In machinery design, a key is an element that can be used to connect a rotating machine component to a shaft. The key is engaged with both the rotating machine component and the shaft to prevent relative rotation between the rotating machine component and the shaft to permit torque transmission. The shaft and the rotating machine component respectively include a keyseat (e.g., pocket) and a cooperating keyway (e.g., slot) in which the key is received in order to define a keyed joint between the shaft and the rotating machine component. Keyed joints can cause stress concentrations in the keyed components when a torque is transmitted between the components. The components must be sized in consideration of such stress concentrations. Improvement is desirable.

SUMMARY

In one aspect, the disclosure describes a Woodruff key coupling system for torque transmission. The system comprises:
  a Woodruff key;
  a rotatable shaft having a rotation axis, the shaft including a keyseat having a keyseat opening defined in an outer surface of the shaft, a first part of the Woodruff key being received in the keyseat via the keyseat opening, the keyseat including:
  a pocket engaged with the first part of the Woodruff key, the pocket having a maximum pocket depth relative to the keyseat opening;
  a first keyseat extension extending in a first axial direction from the Woodruff key relative to the rotation axis of the shaft, a maximum depth of the first keyseat extension relative to the keyseat opening being less than the maximum pocket depth; and
  a second keyseat extension extending in a second axial direction opposite the first axial direction from the Woodruff key relative to the rotation axis of the shaft, a maximum depth of the second keyseat extension relative to the keyseat opening being less than the maximum pocket depth; and
  a component in torque-transmitting engagement with the shaft, the component including a keyway, a second part of the Woodruff key being received in the keyway.

In another aspect, the disclosure describes a rotatable component for keyed coupling with another component. The rotatable component has a rotation axis and comprises:
  a keyseat having a keyseat opening for receiving a key therein, the keyseat including:
  a pocket including a concave floor engageable with a part of the key, the floor having a curved axial cross-sectional profile relative to the rotation axis of the rotatable component;
  a first keyseat extension extending in a first axial direction from the pocket relative to the rotation axis of the rotatable component; and
  a second keyseat extension extending in a second axial direction opposite the first axial direction from the pocket relative to the rotation axis of the rotatable component.

In a further aspect, the disclosure describes a method of forming a keyseat in a component having a rotation axis. The keyseat includes a pocket defining a circular segment engageable with part of a Woodruff key, a first keyseat extension extending in a first axial direction from the pocket relative to the rotation axis of the component, and a second keyseat extension extending in a second axial direction opposite the first axial direction from the pocket relative to the rotation axis of the component. The method comprises:
  driving a Woodruff cutter; and
  using radial and axial translation of the Woodruff cutter relative to the rotation axis of the component to machine the keyseat including the pocket, the first keyseat extension and the second keyseat extension into the component.

Further details of these and other aspects of the subject matter of this application will be apparent from the detailed description included below and the drawings.

DESCRIPTION OF THE DRAWINGS

Reference is now made to the accompanying drawings, in which:

FIG. 1 shows an axial cross-section view of an exemplary turbofan gas turbine engine including a keyed coupling system as described herein;

FIG. 2 is a perspective view of a Woodruff key and a shaft defining an exemplary keyseat of the keyed coupling system of FIG. 1;

FIG. 3 is an axial cross-section view of an exemplary keyed coupling system including the keyseat of FIG. 2;

FIG. 4A is a structural stress map around a baseline keyseat formed in a shaft under a bending load;

FIG. 4B is an enlarged portion of the structural stress map of FIG. 4A;

FIG. 4C is a structural stress map around the keyseat of FIG. 2 formed in a shaft under the bending load;

FIG. 4D is an enlarged portion of the structural stress map of FIG. 4C;

FIG. 5A is a structural stress map around the baseline keyseat of FIG. 4A formed in the shaft under a torsional load;

FIG. 5B is an enlarged portion of the structural stress map of FIG. 5A;

FIG. 5C is a structural stress map around the keyseat of FIG. 2 formed in the shaft under the torsional load;

FIG. 5D is an enlarged portion of the structural stress map of FIG. 5C;

FIG. 7 is a schematic illustration of Woodruff cutter and an exemplary toolpath for machining the keyseat of FIG. 2 into a shaft.

DETAILED DESCRIPTION

Figure 6:
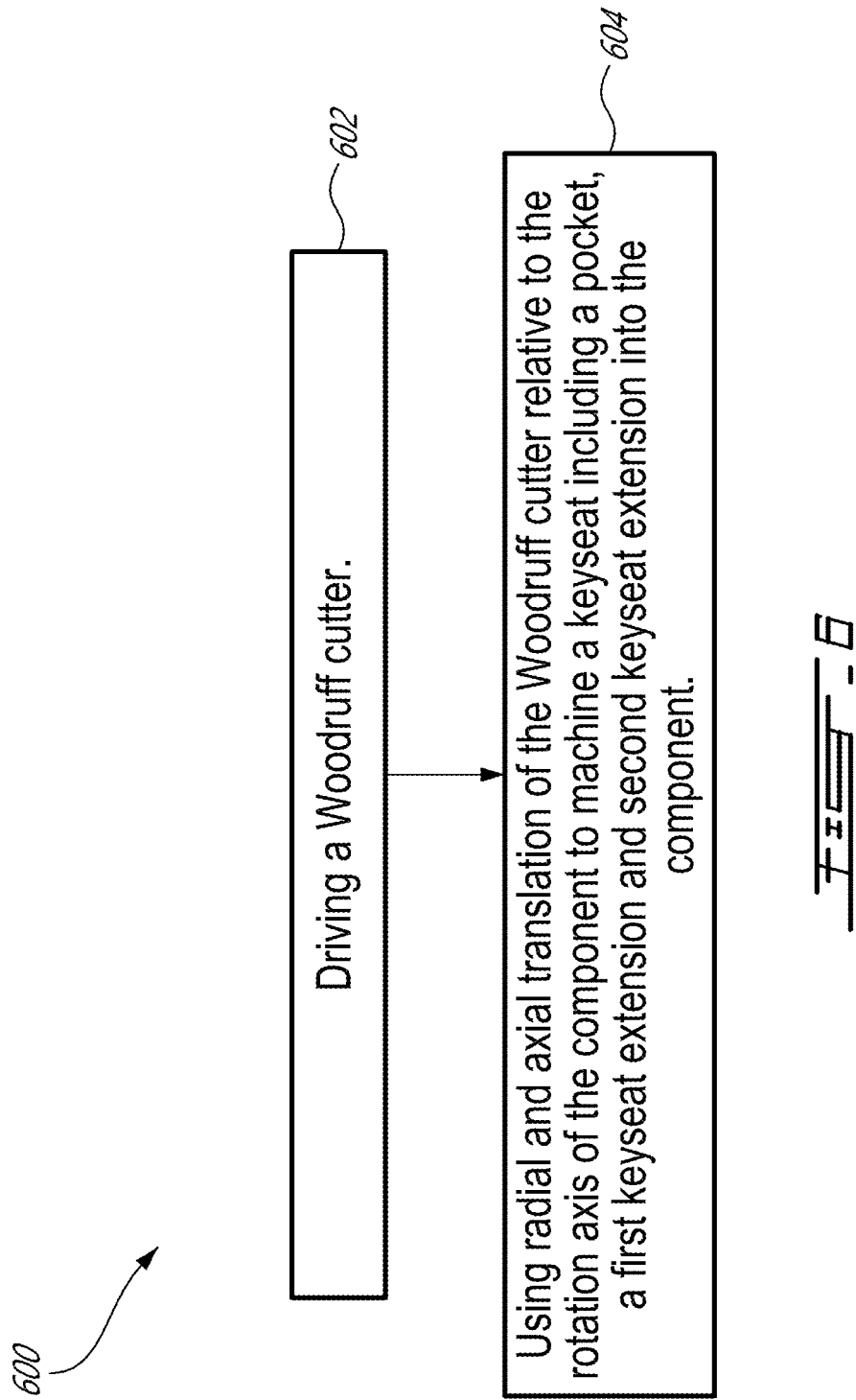
FIG. 6 is a flowchart of a method of forming a keyseat in a component.

The present disclosure describes (e.g., Woodruff) keyed coupling systems to establish torque transmission between a first component (e.g., shaft) and a second component (e.g., shaft, gear, pulley, wheel, coupler). During torque transmission, keyed joints define a load path between the two components. The geometry and configuration of existing keyed joints can cause stress concentrations which may also be subjected to cyclic loading. Such stress concentrations may be caused by the presence of a keyseat in a shaft for example. The design of keyed joints must take into account peak stresses caused by such stress concentrations to properly size the components and obtain a suitable fatigue life under the applicable loading conditions.

In some embodiments, the keyed coupling systems described herein may include configurations of keyseats that promote reduced peak stresses compared to other keyseat configurations. In some embodiments, the keyed coupling systems described herein may consequently promote reduced shaft size and weight, and/or improved fatigue life of components for example.

In some embodiments, the configuration of keyseats described herein may be suitable for use with Woodruff keys. For example, the configuration of the keyseats described herein may retain the relatively simple installation and removal of Woodruff keys. In some embodiments, the keyseats described herein may be formed using a traditional Woodruff cutter.

The terms "engaged with" and "coupled to" may include both direct engagement/coupling (in which two elements contact each other) and indirect engagement/coupling (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 illustrates a gas turbine engine 10 (referred hereinafter as "engine 10") of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may include any type of engine suitable for use in aircraft applications.

Engine 10 may include one or more keyed coupling systems 20 (referred hereinafter as "system 20") as described herein. Even though system 20 is illustrated and described in the context of engine 10, it is understood that system 20 may be used to establish torque transmission in various (e.g., aviation, automotive, marine, industrial) applications. In the exemplary embodiment illustrated in FIG. 1, system 20 is used for torque transfer between motive power source 22 and oil pump 24, which may be part of a lubrication system of engine 10. Oil pump 24 may supply lubricating fluid to one or more lubrication loads 26 of engine 10 such as bearings and gears that require lubrication and/or cooling.

Motive power source 22 may be drivingly engaged (e.g., in torque-transmitting engagement) with oil pump 24 via system 20. Sump 28 may be in fluid communication with lubrication load 26 and with oil pump 24 to collect oil from lubrication load 26 and return the oil to oil pump 24 for recirculation. Motive power source 22 may be an electric motor, hydraulic motor, pneumatic motor and/or a rotating/driven shaft of engine 10 drivingly coupled to oil pump 24 via an accessory gearbox and keyed coupling system 20 for example.

FIG. 2 is a perspective view of an exemplary rotatable component (e.g., shaft 30) and key 31 which may be part of system 20. The rotatable component may be input shaft 30 of oil pump 24 that may be driven (i.e., receive an input torque) from motive power source 22 for example. Shaft 30 may be rotatable about rotation axis RA. Shaft 30 may include keyseat 32 formed therein. Keyseat 32 may include opening 34 defined in a radially-outer surface of shaft 30 for receiving a suitable key 31 therein. Keyseat 32 may include pocket 36 for mating engagement with part of the key received into keyseat 32. Keyseat 32 may include one or more axial keyseat extensions 38A, 38B that do not engage with key 31 during operation. First keyseat extension 38A may extend in a first axial direction from pocket 36 (and from key 31) relative to rotation axis RA of shaft 30. Second keyseat extension 38B may extend in a second axial direction opposite the first axial direction from pocket 36 (and from key 31) relative to rotation axis RA of shaft 30.

In some situations, keyseat 32 could instead be formed in a bore of a component (e.g., gear, pulley, wheel, coupler) that is mated and in torque-transmitting engagement with a shaft, and a cooperating keyway could instead be formed in the shaft.

FIG. 3 is an axial cross-section view of part of an exemplary system 20. System 20 may include shaft 30 with keyseat 32 shown in FIG. 2, key 31, and another rotatable component 42 that is in torque-transmitting engagement with shaft 30 via key 31. The cross-sectional view is taken in radial plane RP parallel to and containing rotation axis RA of shaft 30 and of component 42. Component 42 may include any device that is configured to induce rotary motion in, or have rotary motion induced by, shaft 30. As non-limiting examples, component 42 may include another shaft, gear, pulley, wheel and/or coupler.

Component 42 may include central bore 44 in which shaft 30 is received. Component 42 may include keyway 46 opening into central bore 44. When shaft 30 and component 42 are assembled together in a torque-transmitting engagement, upper part 31A of key 31 may be received into and engaged with keyway 46 formed in component 42, and lower part 31B of key 31 may be received into and engaged with (e.g., pocket 36) of keyseat 32 formed in shaft 30.

In some embodiments, key 31 may be a Woodruff key but it is understood that other types of keys may be suitable. For example, key 31 may have an axial cross-sectional profile shaped as a circular segment as shown in FIGS. 2 and 3. In some embodiments, key 31 may have a semicircular axial cross-sectional profile. In some embodiments, key 31 may have an axial cross-sectional profile shaped as an elliptical segment. Key 31 may have a thickness perpendicular to the page in FIG. 3. The thickness of key 31 may be selected to provide the desired fit within keyseat 32 and keyway 46. In some embodiments, the thickness of key 31 may be substantially uniform. In some embodiments, the width of keyseat 32 perpendicular to the page in FIG. 3 may be substantially uniform. In various embodiments pocket, 36 and keyseat extensions 38A, 38B may have different or substantially identical (e.g., and uniform) widths. Keyseat extensions 38A, 38B may not be engaged with key 31.

In some embodiments, pocket 36 may have floor 48 having a curved axial cross-sectional profile that engages with and conforms to the shape of part (e.g., underside 50 in FIG. 2) of key 31 facing radially inwardly relative to rotation axis RA. Pocket 36 may also include sidewalls that engage with cooperating sidewalls of key 31. In some embodiments, floor 48 of pocket 36 may have an arcuate axial cross-sectional profile having pocket radius R. In some embodiments, the axial cross-sectional profile of floor 48 of pocket 36 may include a circular arc. In some embodiments, the axial cross-sectional profile of floor 48 of pocket 36 may include part of an ellipse and/or part of an oval. It is understood that other types of curvatures of floor 48 and of key 31 may be suitable. For example, underside 50 of key 31 may have a convex (e.g., fully or partially curved and/or multifaceted) axial cross-sectional profile, and floor 48 may have a cooperating (e.g., conforming) concave axial cross-sectional profile. In some embodiments, keyseat 32 and key 31 may be substantially symmetric or asymmetric about axial plane AP that is normal to rotation axis RA.

Features of keyseat 32 may be dimensioned to provide desired structural performance and mitigate peak stresses in shaft 30 due to the presence of keyseat 32 in shaft 30. Dimensions of keyseat 32 for specific applications and load conditions may be determined empirically and/or via simulation and modelling using finite element analysis software for example. In some embodiments, axial length W of keyseat 32 along rotation axis RA of shaft 30 may be equal to or greater than 1.33 times pocket radius R. In some embodiments, axial length W of keyseat 32 along rotation axis RA of shaft 30 may be about two times pocket radius R. In some embodiments, axial length W of keyseat 32 along rotation axis RA of shaft 30 may be between 1.33 and 10 times pocket radius R. In some embodiments, axial length W of keyseat 32 along rotation axis RA of shaft 30 may be between 1.33 and 5 times pocket radius R.

The maximum depths from opening 34 of keyseat extensions 38A, 38B and of pocket 36 may also differ. For example, pocket 36 may have a greater depth than those of keyseat extensions 38A, 38B so that when key 31 is seated into pocket 36, the cooperating mating surfaces of pocket 36 and key 31 may hinder or prevent relative axial movement between pocket 36 and key 31. In reference to FIG. 3, a maximum depth H of pocket 36 may be greater than a maximum depth h of keyseat extension(s) 38A and/or 38B. In some embodiments, maximum depths h of keyseat extensions 38A and 38B may differ from each other, or may be substantially identical. In some embodiments, maximum depth h of keyseat extension(s) 38A and/or 38B may be between 0.5 times maximum depth H of pocket 36 and 0.8 times maximum depth H of pocket 36. In some embodiments, maximum depth h of keyseat extension(s) 38A and/or 38B may be about ⅔ of maximum depth H of pocket 36. The difference(s) in maximum depths H and h may result in keyseat 32 having a stepped floor.

Axial cross-sectional profiles of keyseat extension(s) 38A, 38B may respectively define extension floors 52A, 52B and extension transitions 54A, 54B. Extension transitions 54A, 54B may provide respective geometric transitions between extension floors 52A, 52B and opening 34 formed in the surface of shaft 30. In some embodiments, axial cross-sectional profiles of extension transitions 54A, 54B may each define a linear and planar ramp (e.g., chamfer) extending between extension floor 52A or 52B and opening 34. In some embodiments, axial cross-sectional profiles of extension transitions 54A, 54B may be curved (e.g., arcuate). In some embodiments, axial cross-sectional profiles of extension transitions 54A, 54B may include a circular arc and/or part of an ellipse or oval. In various embodiments, axial cross-sectional profiles of extension transitions 54A, 54B may differ from each other or may be substantially identical. In some embodiments, axial cross-sectional profiles of extension transitions 54A, 54B may have transition radius r. In some embodiments, transition radius r may be substantially identical to pocket radius R. In some embodiments, transition radius r may be greater than or smaller than pocket radius R. In some embodiments, transition radius r may have a non-zero value. In some embodiments, transition radius r may be two or more times pocket radius R.

In some embodiments, extension floors 52A, 52B may be substantially planar and substantially parallel to rotation axis RA. In some embodiments, substantially tangent-continuous transitions may exist between extension transitions 54A, 54B and respective extension floors 52A, 52B. For example, extension transitions 54A, 54B may define respective fillet transitions between extension floors 52A, 52B and opening 34.

During operation of system 20, torque may be transmitted via key 31 either from shaft 30 to component 42 or from component 42 to shaft 30 as in the illustrated example of shaft 30 being an input shaft of oil pump 24. Key 31 may also serve as an overload fuse between shaft 30 and component 42 such that in the event of overloading, key 31 would fail (e.g., shear) prior to damage being caused to shaft 30 and/or component 42 during operation. Such failure of key 31 would cause torque transfer between shaft 30 and component 42 to be stopped.

One desirable property of using Woodruff keys is the ease of assembly and disassembly. In some embodiments, the configuration of keyseat 32 may accommodate the use of Woodruff keys while retaining such desirable properties of using Woodruff keys.

In reference to FIGS. 4A-4D and 5A-5D, the stress maps depicted herein were generated using finite element analysis software using digital models of the applicable structures, and using a simulated unit (dummy) bending load in FIGS. 4A-4D, and using a simulated unit (dummy) torsional load in FIGS. 5A-5D. As explained below, experiments have revealed that the configuration of keyseat 32 may, in some embodiments, promote a reduction in magnitude and relocation of peak (maximum principal) stresses on a component such as shaft 30 that includes keyseat 32 instead of baseline Woodruff keyseat 58. The stress maps depicted herein are examples under the operating conditions selected for illustration only. It is understood that the stress maps may be different for other operating conditions.

FIG. 4A is a perspective view of a structural stress map around a baseline Woodruff keyseat 58 formed in baseline shaft 56 under an exemplary bending load. The bending load applied to baseline shaft 56 defines as a simply supported beam with a concentrated load applied at a mid span of the shaft where Woodruff keyseat 58 is located. The stress magnitudes displayed in the stress map may be compressive or tensile depending on whether baseline keyseat 58 is on the same side or one the opposite side of the applied bending load. FIG. 4B shows an enlarged portion of baseline keyseat 58 of FIG. 4A. The stress map shows regions 60A, 60B of relatively low stress, and regions 62A, 62B of relatively high stress.

FIG. 4C is a perspective view of a structural stress map around keyseat 32 of system 20 under the same bending load depicted in FIG. 4A for comparison. FIG. 4D shows an enlarged portion of keyseat 32 of FIG. 4C. The stress map shows regions 64A, 64B of relatively low stress, and regions 66A, 66B of relatively high stress. Comparing FIGS. 4A and 4C reveals a dispersion and relocation of regions 62A, 62B of relatively high stress in baseline keyseat 58 to regions 66A, 66B of relatively high stress in keyseat 32. For the specific unit bending loading depicted in FIGS. 4A and 4C as an example, a comparison of the magnitudes of the highest peak stresses (e.g., in regions 62A, 62B, 66A and 66B) has revealed a 23% reduction in magnitude of the maximum peak stresses.

FIG. 5A is a perspective view of a structural stress map around the baseline Woodruff keyseat 58 formed in baseline shaft 56 under a unit torsional load. FIG. 5B shows an enlarged portion of baseline keyseat 58 of FIG. 5A. The stress map shows regions 68A, 68B of relatively low stress, and region 70A of relatively high stress.

FIG. 5C is a perspective view of a structural stress map around keyseat 32 formed in shaft 30 under a unit torsional load. FIG. 5D shows an enlarged portion of keyseat 32 of FIG. 5C. The stress map shows regions 72A, 72B of relatively low stress, and region 74A of relatively high stress. Comparing FIGS. 5A and 5C reveals a dispersion and relocation of regions 70A, of relatively high stress in baseline keyseat 58 to region 74A of relatively high stress in keyseat 32. For example, the region of peak stress depicted as region 74A is now farther from the outer surface of shaft 30. For the specific unit torsional loading depicted in FIGS. 5A and 5C as an example, a comparison of the magnitudes of the highest peak stresses (e.g., in regions 70A and 74A) has revealed a 26% reduction in magnitude of the maximum peak stresses.

FIGS. 6 and 7 illustrate an exemplary method 600 for forming keyseat 32 in shaft 30 or in another component. FIG. 6 is a flowchart of method 600 and FIG. 7 provides a graphical illustration of method 600 using Woodruff cutter 76. In some embodiments of keyseat 32, the same Woodruff cutter 76 may be used to machine the entirety of keyseat 32 in a single machining operation. In some embodiments of keyseat 32, different or other machining operations using different or other tools may be required. In some embodiments, keyseat 32 may be formed in a metallic (e.g., steel) shaft 30 or other rotatable component by a suitable material removal process such as machining using a suitable (e.g., computer numerical control) machine tool for example.

Method 600 may be used to machine keyseat 32 as depicted herein or other configurations of keyseat 32 into a component such as shaft 30. Accordingly, aspects of keyseat 32 and of system 20 described herein may be incorporated into method 600. The steps of method 600 are provided for illustrative purposes. Variations of the steps, omission or substitution of various steps, or additional steps may be considered. Method 600 may include:

driving (i.e., rotating) a Woodruff cutter 76 (see block 602); and using radial and axial translation of the Woodruff cutter 76 relative to rotation axis RA to machine keyseat 32 including pocket 36, first keyseat extension 38A and second keyseat extension 38B (see block 604).

FIG. 7 schematically illustrates Woodruff cutter 76 and an exemplary toolpath 78 for machining keyseat 32 into shaft 30. It is understood that other types of toolpaths and cutters may be suitable. Shaft 30 and keyseat 32 are shown schematically in an axial cross-sectional view taken in radial plane RP. Tool path 78 may include one or more radial movements 78A and axial movements 78B that may be used during machining. In situations where pocket radius R and transition radius r (shown in FIG. 3) are substantially equal, Woodruff cutter 76 of a same outer radius may be selected to simplify toolpath 78. FIG. 7 shows toolpath 78 for a single (e.g., final) machining pass but it is understood that multiple machining passes at different depths may be used in some embodiments. In some embodiments, method 600 may use only a single tool (e.g., Woodruff cutter 76) to machine the entire keyseat 32. In some embodiments, method 600 may use a plurality of tools (e.g., side milling or other types of cutters) to machine the entire keyseat 32.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. A Woodruff key coupling system for torque transmission, the system comprising:
   a Woodruff key;
   a rotatable shaft having a rotation axis, the shaft including a keyseat having a keyseat opening defined in an outer surface of the shaft, a first part of the Woodruff key being received in the keyseat via the keyseat opening, the keyseat including:
      a pocket engaged with the first part of the Woodruff key, the pocket having a maximum pocket depth relative to the keyseat opening;
      a first keyseat extension extending in a first axial direction from the Woodruff key relative to the rotation axis of the shaft, a maximum depth of the first keyseat extension relative to the keyseat opening being less than the maximum pocket depth; and
      a second keyseat extension extending in a second axial direction opposite the first axial direction from the Woodruff key relative to the rotation axis of the shaft, a maximum depth of the second keyseat extension relative to the keyseat opening being less than the maximum pocket depth; and
   a component in torque-transmitting engagement with the shaft, the component including a keyway, a second part of the Woodruff key being received in the keyway,
   wherein the maximum depth of the first keyseat extension is between 0.5 times the maximum pocket depth and 0.8 times the maximum pocket depth.

2. The system of claim 1, wherein:
   a floor of the pocket has an arcuate axial cross-sectional profile having a pocket radius; and
   an axial length of the keyseat along the rotation axis of the shaft is equal to or greater than 1.33 times the pocket radius.

3. The system of claim 2, wherein the axial length of the keyseat is about two times the pocket radius.

4. The system of claim 1, wherein the maximum depth of the second keyseat extension is between 0.5 times the maximum pocket depth and 0.8 times the maximum pocket depth.

5. The system of claim 1, wherein the maximum depth of the first keyseat extension is about ⅔ of the maximum pocket depth.

6. The system of claim 5, wherein the maximum depth of the second keyseat extension is about ⅔ of the maximum pocket depth.

7. The system of claim 1, wherein:
   a floor of the pocket has an arcuate axial cross-sectional profile; and
   an axial cross-sectional profile of the first keyseat extension defines an arcuate transition between the keyseat opening and a floor of the first keyseat extension.

8. The system of claim 7, wherein:
   the arcuate axial cross-sectional profile of the floor of the pocket has a pocket radius; and the arcuate transition has a transition radius substantially equal to the pocket radius.

9. A rotatable component for keyed coupling with another component, the rotatable component having a rotation axis and comprising:
a keyseat having a keyseat opening for receiving a key therein, the keyseat including:
a pocket including a concave floor engageable with a part of the key, the floor having a curved axial cross-sectional profile relative to the rotation axis of the rotatable component;
a first keyseat extension extending in a first axial direction from the pocket relative to the rotation axis of the rotatable component; and
a second keyseat extension extending in a second axial direction opposite the first axial direction from the pocket relative to the rotation axis of the rotatable component,
wherein:
the pocket has a maximum pocket depth relative to the keyseat opening;
a maximum depth of the first keyseat extension relative to the keyseat opening is less than the maximum pocket depth; and
the maximum depth of the first keyseat extension is between 0.5 times the maximum pocket depth and 0.8 times the maximum pocket depth.

10. The rotatable component of claim 9, wherein the rotatable component is a shaft of an oil pump of a gas turbine engine.

11. The rotatable component of claim 9, wherein the curved axial cross-sectional profile of the concave floor includes an arc.

12. The rotatable component of claim 11, wherein:
the arc has a radius; and
an axial length of the keyseat opening is equal to or greater than 1.33 times the radius.

13. The rotatable component of claim 9, wherein
a maximum depth of the second keyseat extension relative to the keyseat opening is less than the maximum pocket depth.

14. The rotatable component of claim 9, wherein an axial cross-sectional profile of the first keyseat extension defines a curved transition between the keyseat opening and a floor of the first keyseat extension.

15. The rotatable component of claim 14, wherein:
the curved axial cross-sectional profile of the concave floor of the pocket includes a first arc; and
the curved transition between the keyseat opening and the floor of the first keyseat extension includes a second arc.

16. The system of claim 1, wherein first keyseat extension and the second keyseat extension do not engage with the Woodruff key.

* * * * *